Feb. 12, 1924.  
H. TANNER  
1,483,529  
DEVICE FOR QUICKLY FINDING HARMONIOUS COLOR COMBINATIONS  
Filed Jan. 3, 1920  
3 Sheets-Sheet 1
Fig. 1.
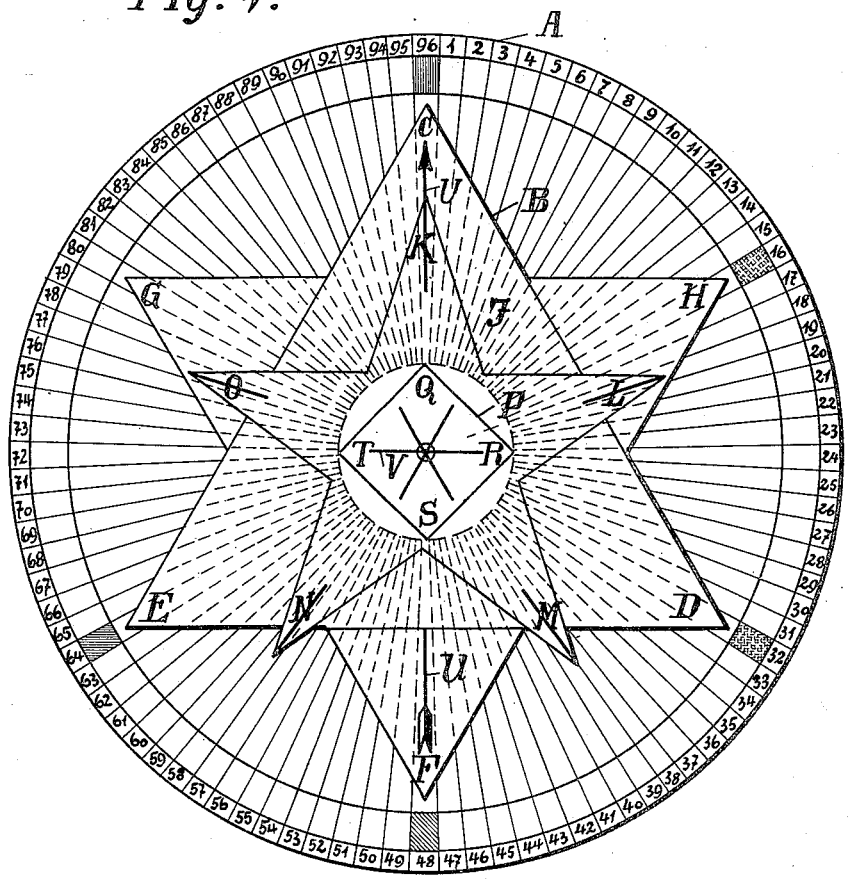
Fig. 2
Inventor:  
Hermann Tanner,  
By James Hamilton,  
his attorney.

Inventor:
Hermann Tanner,
By James Hamilton,
his Attorney.

Feb. 12, 1924. 1,483,529
H. TANNER
DEVICE FOR QUICKLY FINDING HARMONIOUS COLOR COMBINATIONS
Filed Jan. 3, 1920 3 Sheets-Sheet 3
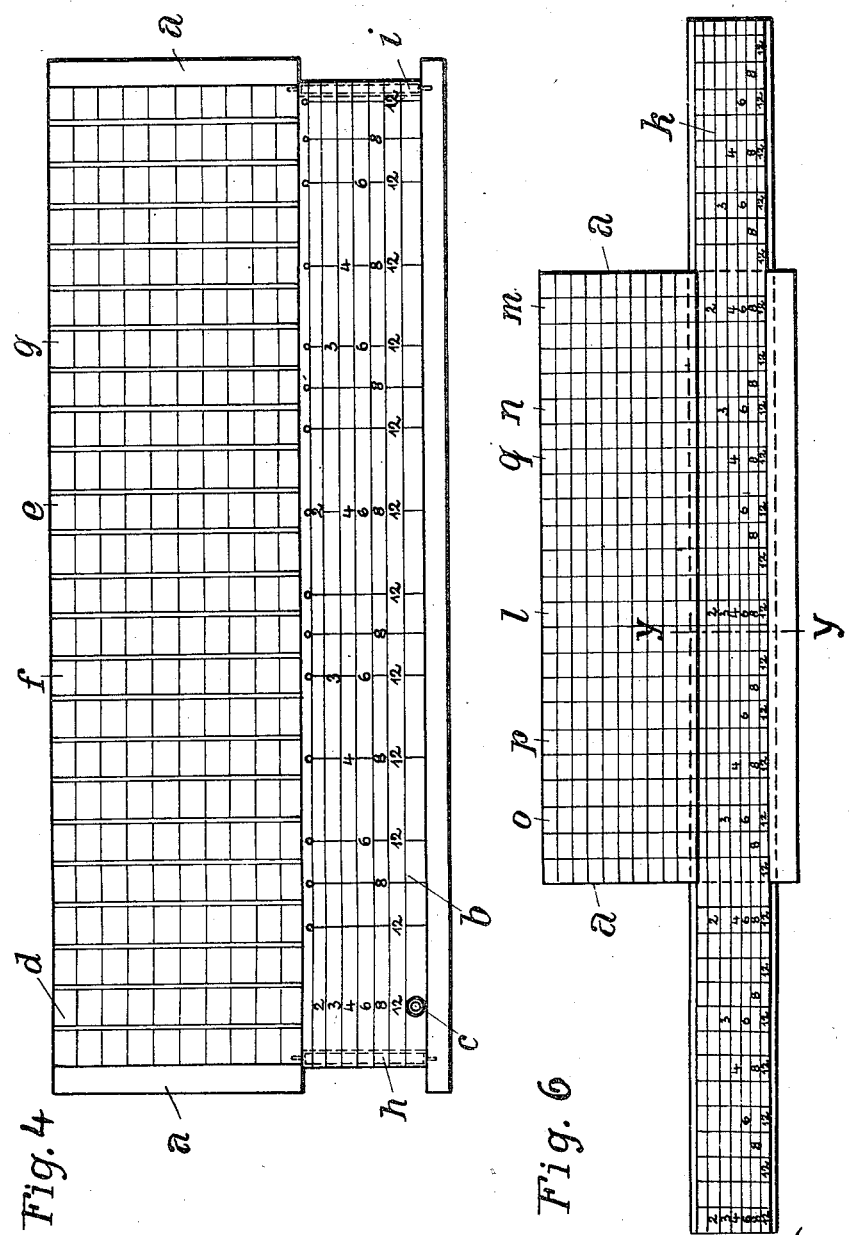
Inventor:
Hermann Tanner
By James Hamilton
his Attorney Patented Feb. 12, 1924.

1,483,529

UNITED STATES PATENT OFFICE.

HERMANN TANNER, OF SAMADEN, SWITZERLAND.

DEVICE FOR QUICKLY FINDING HARMONIOUS COLOR COMBINATIONS.

Application filed January 3, 1920. Serial No. 349,223.

*To all whom it may concern:*

Be it known that I, HERMANN TANNER, a citizen of Switzerland, and residing at Samaden, Switzerland, have invented certain new and useful Improvements in a Device for Quickly Finding Harmonious Color Combinations, of which the following is a statement.

When several colors appear simultaneously and their color effect (the consonance of their tones or the totality of their brightness) has an agreeable effect on the eye, these colors are said to harmonize. For industrial practice it is, now, of great importance to secure a full harmony, wherever colors come into question.

If suitably educated, a man, having a normal sense for color, may combine by himself colors producing a harmonious effect. Most people, however, lack this capacity.

The object of the present invention is to provide a device which will allow of finding in a most simple, convenient and quick manner color combinations of a harmonious effect, or to ascertain for one or several given colors other colors or color combinations of a supplementing and harmonious character, which will meet both the normal sense of color and also the law of color harmony.

The device according to the present invention consists of a color dial, arranged on some known color theory, over which a system of indicators are movable, the markings on which meet, as regards number and pitch, the same law, which determine the harmonious arrangement of the colors on the dial, so that when one of said markings is set to any of the initial colors, the other markings will point to colors on the said dial, which harmonize with said initial color in a double or multiple chord.

Figure 3:
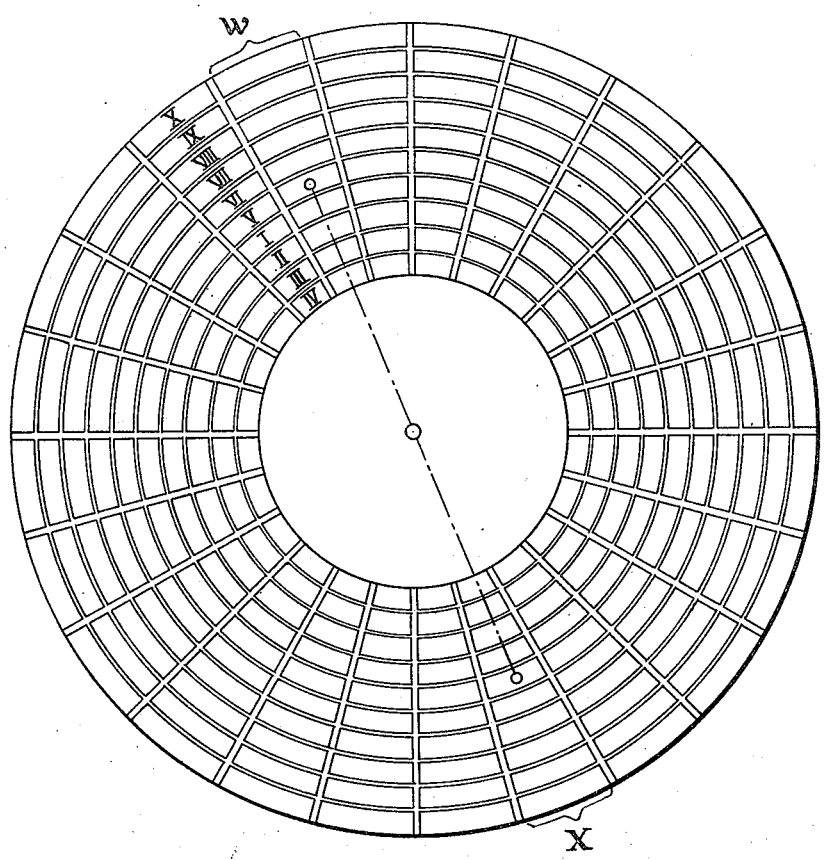
Figure 5:
Figure 7:
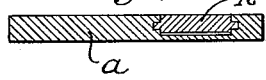

In the accompanying drawings Fig. 1 illustrates a form of the device with a circular color dial. Fig. 2 is a cross section through Fig. 1. Fig. 3 is the dial alone in which besides the pure colors also a number of shades have been embodied, mixed with white, black or gray, respectively. Figs. 4 and 5 are plan and cross section, respectively, of a rule-like form of the color dial with an endless indicator system. Figs. 6 and 7 are, likewise, plan and cross section of a third form of the device, in which both the dial and the indicator system are of a rulelike shape.

In Figs. 1 and 2 A is a color disc, carrying a color dial divided in a radial manner similar to a compass rose, having, for example, 96 sectors, numbered consecutively, and showing a different color tone.

Colors are divided, according to the 3-color theory into:

1. Pure colors:
   (*a*) The three primary or fundamental colors: red, yellow, blue.
   (*b*) The secondary colors as obtained by mixing two primary colors: orange, green, violet.
   (*c*) The other indefinitely dividable intermediate colors.
   (*d*) Color shades obtained by diluting or thinning pure colors.
2. Mixed colors:
   (*a*) The secondary colors mixed with white.
   (*b*) The secondary colors mixed with black.
   (*c*) The secondary colors mixed with gray.
   (*d*) Color shades obtained by diluting or thinning mixed colors.

Combinations of colors blend or constitute a harmony:
   (*a*) By twos, as complementary colors.
   (*b*) By threes or more, in triple, quadruple, quintuple, sextuple, or multiple color combinations.
   (*c*) When, with a given color (that is, one that is at hand), there are coordinated therewith or arranged closely adjacent thereto, colors of a similar shade, tone or tint, in such a manner of relation to one another that the proportional resplendence, brilliancy, brightness, warmth and clearness existing among or embodied in the respective colors, shades, tones and tints pass over and flow or run and become merged into an entirety of pleasing gradations of light and shade.

Accordingly, the primary or basic colors are arranged, on the color-dial, at three trisecting divisions of the circle; that is to say, red at the numeral 96, yellow at 32 and blue at 64; the secondary colors orange, green and violet lie exactly midway between these points, respectively, therefore, at 16, 48 and 80, whereby a division of the circle into six equal portions arises.

Between these primary and secondary colors, the intermediate colors are subjected to a correspondingly mathematically-exact distribution, that is to say, division.

In order now that, with the indicator-device or contrivance, there may be determined the second, third, fourth, fifth, etc., color that harmonizes or blends with a given or predetermined shade of color, there is arranged, upon the indicator-device, for every such regular grouping or comparison of color-tones, to form a double, triple, quadruple, quintuple, sextuple, etc., blend, a system of interrelated markings, which stand, among themselves, in the same mathematical relation as do the oppositely-lying intervals or distances between the colors on the color-dial.

So, as is illustrated in Fig. 1, the indicator-device comprises a suitably transparent disk B that is rotatable and is placed concentrically over the color-disk A. The indicator-disk B bears imprinted, impressed or otherwise marked thereon, a regular six-pointed star which is formed by the intersection of the sides of two oppositely-lying equilateral triangles one of which is superposed upon the other and the points or angles of which are identified in the drawings by the letters C, D, E, and F, G, H, respectively. Lying almost wholly within this six-pointed star, there is drawn a five-pointed star J the points of which are marked K, L, M, N, O, respectively. In this five-pointed star J, there is put a square P that is set upon, or rests upon, one of its corners, which are designated Q, R, S, T. From the point F to the point C, there runs an arrow U. From the common center of all the figures just mentioned, there radiate six lines which form a bundle or group V of rays and which, at the center, subtend equal angles. The prolongations of these lines or rays are half way between the adjacent points of the six-pointed star, the point C of which lies in the same straight line with the point K of the five-pointed star J and the corner Q of the square. As soon as a point of the indicator-device B is set to point to a color-tone displayed upon the color-dial A, then there is indicated, by a second point of the indicator-device B, the color which harmonizes or combines with the selected color-tone to produce or effect a double blend or harmony; or, as the case may be, there are indicated, by a second and a third point of the indicator-device B, or by a second, a third and a fourth point thereof, the colors which combine or unite to form, together with the selected or predetermined color-tone, a triple blend and a quadruple blend or harmony, respectively. Since each color has its exact position on the color-dial or on the color-circle (no matter according to what distribution or classification conformable to laws of color), the indicator-device based upon the same cyclic system indicates precisely the colors that belong together in forming a harmony or blend of colors.

The following examples permit me to show how, with the hereinbefore-described apparatus (according to the three-color theory), there may be found colors that blend or harmonize. There are ascertained or found:

(a) The three primary colors (triple blend), by setting the point C of the six-pointed star at 96 (red); then the point D stands at 32 (yellow) and the point E at 64 (blue). The three stretches or distances, from point to point or between colors, are each an arc equal to one third the circumference, or thirty-two numbers or divisions, in length.

(b) The three secondary colors, complementary or supplementary to the three primary colors (triple blend), by likewise setting the point C at 96. Then the point F stands diametrically opposite 96 (red) at 48 (green), the point G diametrically opposite 32 (yellow) at 80 (violet) and the point H diametrically opposite 64 (blue) at 16 (orange). The three intervals between the secondary colors are again each equal, in length, to a third of the circumference or thirty-two numbers or divisions.

(c) The six tertiary colors, while the point C is left standing at 96 and one reads off the colors indicated by the prolongation of the radial lines forming the central bundle of rays V; or else by setting the point C at 8 (red-orange-red). In the latter case, the points H, D, F, E, G, will likewise stand advanced by eight numbers or divisions each, to the right, or at 24 (yellow-orange-yellow), 40 (yellow-green-yellow), 56 (blue-green-blue), 72 (blue-violet-blue), and 88 (red-violet-red), respectively. The six lengths or intervening stretches are each one sixth of a circumference or sixteen numbers or divisions.

Color blends or harmonies formed from or produced by shades or tones of color which, according to the three-color theory, lie between those belonging to the three hereinbefore-mentioned groupings or combinations (triple blends and sextuple blends), may be ascertained by the rotation of the indicator-device to the right and the positioning of the point C at one of the sectors embracing the divisions 1 to 7, 9 to 15, etc. By this manipulation, there are obtained, for example:

The triple blends or harmonies, 1, 33, 65; 12, 44, 76; 29, 61, 93.

The sextuple blends or chords, 1, 17, 33, 49, 65, 81; 12, 28, 44, 60, 76, 92; 29, 45, 61, 77, 93, 13.

The corresponding intervals are each equal to ⅓ or ⅙ of the circumference, respectively, that is to say, to 32 and 16 divisions, respectively.

By bisecting each of the six arcs that extend successively from tertiary color to tertiary color around the circular color-disk A, there is determined a series of twelve colors (i. e., tints, tones, shades), the interval between each of which and the one immediately following it is one-twelfth of the circumference or periphery of the disk A, or, in the particular case taken (Fig. 1), eight divisions. To these twelve colors or tones, I have given the name, quaternary colors or tones.

Again, by bisecting each of the twelve arc intervals that intervene between or separate the quaternary colors or tints, there is ascertained a series of twenty-four colors or tones between each of which and the one immediately following (or preceding) it in the series there exists a space or stretch equal to one twenty-fourth of the circumference of the disk A or four divisions as illustrated in Fig. 1. These twenty-four colors are designated by me as quinternary colors.

Still further, by halving each of the twenty-four arcs that lie between these quinternary colors, there is defined a series of forty-eight colors or tones each equidistant from the adjacent ones in the series by one forty-eighth of the circle or two divisions marked on the disk A. These forty-eight colors or shades are called by me sexternary colors or shades.

While I have used the terms, "tints," "tones," "shades", in the immediately preceding explanation of the colors of the disk A illustrated in Fig. 1, it is to be understood that the colors of disk A are pure colors, that is to say, colors unmixed or unshaded with, for example, black and gray.

From the foregoing, it will be understood, by all persons skilled in this art, how, by halving, quartering and further subdividing the intervals existing between or separating the colors of the triple blends, there may be determined or found the groups of harmonic colors that follow or join one another in the series, in which the respective intervals between the individual colors are one twelfth, one twenty-fourth, and one forty-eighth, of the periphery or circumference of the disk A, or, as expressed in terms of the graduations or divisions marked thereon, eight, four and two divisions, respectively.

In the same manner double, quadruple, and quintuple color chords are found by means of the arrow U or the pointer of the diamond P and the pentagonal star J, etc.

The color harmonies that may be needed, may not, however, always be composed of or formed by pure colors, as has been assumed in the foregoing explanation and the illustration of Fig. 1. In order, with the apparatus, to be able to group or place together, in harmonies or blends, modifications of the pure colors, as well, it is only necessary to arrange, on the color-plate, by the side of the pure colors, modifications thereof also, formed or produced by clouding or dimming the same with white, black and gray. Fig. 3 shows such a color dial. The pure colors are disposed in the circle I, this time divided into 24 juxtaposed tones. In the concentric inner circles II, III and IV the derivatives shaded with gray are arranged in three depths or gradations, so that the shading increases or deepens from depth II to depth III and on to depth IV. In the circles V, VI, VII which follow radially on circle I outwardly, are disposed the derivatives shaded with white in three depths or gradations, so that the reduction in depth or lightening of the shading proceeds from inside towards outside. Then follow concentrically the circles VIII, IX, and X with the derivatives shaded with black in three depths or gradations, the depth of the shading increasing outwardly. The 24 sectors disposed beside each other in the circle are therefore the sectors of tone equality.

With a dial arranged in such a manner it is possible to combine by aid of the above described indicator system harmonies both of the pure colors and of and in the circles of their derivatives. By setting the point C to a given color the sectors or tone equivalents are found which correspond to the kind or species of harmony, whereupon the stages of the sectors thus found to harmonize may be combined in any variations, so that it is not necessary to select colors of the same color circles; on the contrary, it is possible to combine or group in blends or harmonies, colors of various color circles according to the effect desired (cheerful, austere, gay, quiet, etc., effect). When it has thus been found, that the diametrally opposite rows of sectors W and X harmonize in a double chord, this will be the case for every shade of the one sector W with reference to all shades of the other sector X and vice versa, and all these shades may be combined in double chord with each other according to the desired effect. The same is also the case with the sector rows, which have been found to harmonize in a triple, quadruple, etc., chord; each shade of the one row will, then, harmonize, with each of the other rows in the respective multiple chord and may be combined therewith.

In place of the circular cyclic (closed continuous) arrangement of the color dial, as shown in Figs. 1 and 3, the dial may also be arranged in the form of a rule with the colors following on each other the same as the inches. The indicator system may then still be of a continuous, closed or endless form, say an endless band, or it may also be of the form of a rule and with a beginning and an end. In order that also here one single setting should permit finding a harmonious color combination, the indicator is composed of two abutting indentical halves, each of the total length of the color dial, and each of these halves is divided longitudinally in as many sections, as harmonies are to be found. According to the type of indicator employed, these two halves are combined to form an endless band, or to a rule-like slide of twice the length of the color dial, or consist of two separate rules, slidable either in positive relation or independently.

In the embodiment shown in Figs. 4 and 5, the colors are distributed in 24 tones on a rule-like plate $a$ from left to right next to each other, and each tone is divided into superimposed shades. This subdivision is variable according to the purpose of the device. Beneath the dial $a$ is disposed an endless band $b$, which is twice as long as the full length of the dial $a$. This endless band is passed around the edges of the dial, extended downwards and may be shifted thereon by means of a knob $c$. The length of the indicator band, corresponding to the length of the dial is longitudinally divided in as many equal parts, as there are harmonies to be found with aid of the device. With the device as shown double, triple, quadruple, sextuple, octuple and duodecimal chords may be found. Accordingly the indicator band is divided across the length of the color dial in halves, thirds, etc., and the corresponding dividing lines are marked with the respective numbers, 2 2; 3.3.3; 4,4,4,4; etc. The second half of the band, not seen in the drawing, is divided and marked in exactly the same manner. When, now, it is desired to find for the color tone column $d$ in Fig. 4 a double chord, any of the indicator marks 2 visible on the band $b$ is set to the column $d$, as shown in Fig. 4. All colors then visible over the second 2-mark of the band in the color column $e$ will harmonize in double chord with the initial color. If a triple chord is sought for any color in this column, the 3-mark is set to it, and all colors of those columns above the other visible 3-marks, viz, columns $f$ and $g$ will then be in triple chord with the initial color. By such means it is possible to find for each color of the color dial other colors harmonizing with it in double or multiple chord. When the band $b$ is moved, those marks will appear at the one end, which disappear at the other end, owing to the two halves of the band being identical. Therefore for each position of the band all necessary indicator marks will be visible for the possible harmonies.

For facilitating the moving of the band $b$, the edges of the dial $a$ may also be provided with rollers $h$ and $i$.

In the form shown in Figs. 6 and 7, the body $a$ carrying the color dial is arranged in the same manner as according to Fig. 4. The indicator is, however, here made in form of a sliding bar $k$, for which a sort of guide is provided in the dial body $a$, the same as with sliding rules. The slide $k$ is twice as long as the color dial and is divided into two abutting, identical halves, which are divided in the same manner as the indicator band according to Fig. 4. The operation is correspondingly the same as with the device according to Figs. 4 and 5. When, for example, a double, triple or quadruple chord is to be found for a color from column 1, a 2- 3- or 4- mark of the slide $k$ is set beneath this color, and over the corresponding marks of the slide within the dial $a$ the columns are read, the colors of which harmonize in the desired chord. So, for example, the colors of column $l$ correspond in double chord to those of column $m$; those of columns $n$ and $o$ to them in triple chord, and those of columns $p$, $q$ and $m$ in quadruple chord, etc.

For rendering the device according to Figs. 6 and 7 more handy the long sliding indicator $k$ might be made to fold or to be set together, being divided in the middle along the line $y-y$.

The devices according to Figs. 4, 5 and 6, 7, respectively, may also be arranged in a manner contrary to that described, in so far as the color dials may be slidable with reference to the indicator, and be twice as long as the latter and composed of two identical halves. Also a curved, sectorlike form is possible in place of the rectilinear form according to Fig. 6. The indicator band or slide may also be made of transparent material and disposed or slidable directly over the colors.

In place of the subdivision of the colors into 96 or into 24 tones, any other subdivision may be as well be chosen. Also the number of mixed derivatives of the pure colors may be chosen at will. Furthermore the color dial may be disposed after any color system, as, for example, on the four color theory. All these variations are immaterial with regard to the principle of the invention.

Neither it it necessary that the colors be disposed on the device itself. But the term, color-designations, used herein is to be taken in a sense broad enough to include the colors themselves, as well as numbers or letters designating the same. The colors may be arranged on sheets or the like separate from the device and correspond in their series and marking to the numbers or letters on the device. Then only the numbers or letters of the indicator position are read on the dial, and the desired colors will be found under the same markings on the color sheets. Furthermore, there may, by the side of such numbers (or letters), be indicated or suggested faintly or in small patches or areas on the apparatus, the colors belonging to or designated by the numbers (or letters) respectively, for the purpose of a superficial orientation or rough approximation gotten by a cursory view; the exact determination of the color-tones would be made, however, only from a separate accompanying table or list, to which the numbers (or letters) refer with precision.

The apparatus hereinbefore described is, by reason of the abundance and diversity of the colors presented, suitable both for training purposes and also for practical use in trade, art and business and in professional, mercantile and private life, to which it will be found to be particularly well adapted.

By suitable modification, even a color-blind person may, with the changed apparatus, be put in a position to bring together harmonious combinations of colors. Since the apparatus functions with mathematical exactness, the colors belonging together to form a color blend or harmony may be correctly determined, even in case the sense perception of the user is defective. If, in such a contrivance, there be arranged letter or numbers, instead of the individual colors as set out in connection with the description of the arrangement of parts hereinbefore given, a color-blind person will be put in position to use the contrivance properly and to obtain correct results, because he is relieved, by these indicia, from passing judgment upon the colors themselves. The apparatus discloses to him, in every case, the correct colors, as the same belong or group themselves according to the law of color-harmony.

Instead of imprinting, impressing or stamping the geometric figures (the six-pointed and five-pointed stars, the square P and the bundle of rays V) on the indicator-disk B, these figures may be made on separate pieces of material and these pieces may be pasted or otherwise suitably affixed upon the disk B, in their proper relative positions and one over the other.

It is to be understood that the term, markings, as used in the claims hereinafter appended, is not to be taken in a restricted sense as meaning, for example, only numerals, such as the numerals 1 to 96, inclusive, that are shown at the periphery of the disk A, Fig. 1; but this term is intended to include any markings by which the colors may be identified.

I claim—

1. A device having markings for determining at one viewing a multiplicity of harmonious color-combinations, including a color-chart provided with markings for a multiplicity of such color-combinations; and an indicating member movably mounted relatively to the color-chart and arranged with respect thereto to point out thereon a simultaneously-observable multiplicity of harmonious color-combinations comprising multiple harmonious color-combinations.

2. A device having markings for determining at one viewing a multiplicity of harmonious color-combinations, including a color-chart provided with markings for a multiplicity of harmonious color-combinations and having displayed upon it a multitude of colors; and an indicating member movably mounted relatively to the color-chart and arranged with respect thereto to point out thereon a simultaneously-observable multiplicity of harmonious color-combinations comprising multiple harmonious color-combinations; the size and shape and mounting of the indicating member relatively to the color-chart permitting all the colors displayed thereon to be readily viewed as an entirety in every operative position of the indicating member.

3. A device for quickly finding harmonious color combinations, comprising a chart having pure colors and their derivatives as well as mixed colors and their derivatives arranged thereon in accordance with the laws of color harmony, and an indicator movably connected thereto and consisting of a number of concentric equilateral geometrical figures, each of said figures having one of its corners pointing in the same direction with the others.

4. A device for quickly finding harmonious color combinations, comprising a chart having colors and their derivatives arranged thereon in accordance with the laws of color harmony, and an indicator movably connected thereto and consisting of a number of concentric equilateral geometrical figures, all of said figures being arranged upon one indicator member and having one of their corners pointing in the same direction; the size and arrangement of the indicator relative to the chart permitting all the colors thereon to be readily viewed as an entirety in every operative position of the indicator.

In testimony whereof I have hereunto set my signature in the presence of two subscribing witnesses.

HERMANN TANNER.

Witnesses:
 FRIEDRICK LUTZ,
 M. MULLER.